US012596248B2

(12) United States Patent (10) Patent No.: US 12,596,248 B2
Han et al. (45) Date of Patent: Apr. 7, 2026

(54) PATTERN ELECTRODE STRUCTURE FOR ELECTRO-WETTING APPARATUS

(71) Applicants: Hyundai Motor Company, Seoul (KR); Kia Corporation, Seoul (KR)

(72) Inventors: Kwang-Joon Han, Whasung-Si (KR); Jai-Min Han, Whasung-Si (KR); Byung-Kyu Cho, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 736 days.

(21) Appl. No.: 17/747,720

(22) Filed: May 18, 2022

(65) Prior Publication Data

US 2023/0185079 A1 Jun. 15, 2023

(30) Foreign Application Priority Data

Dec. 10, 2021 (KR) ........................ 10-2021-0176416

(51) Int. Cl.
 *G02B 26/00* (2006.01)
 *G09G 3/34* (2006.01)
(52) U.S. Cl.
 CPC ........... *G02B 26/005* (2013.01); *G09G 3/348* (2013.01); *G02B 2207/115* (2013.01); *G09G 2300/0426* (2013.01)
(58) Field of Classification Search
 CPC .. G02B 26/005; G02B 2207/115; G02B 1/18; G09G 3/348; G09G 2300/0426; B08B 7/02; B08B 11/04
 See application file for complete search history.

(56) References Cited

U.S. PATENT DOCUMENTS

| | | | |
|---|---|---|---|
| 8,854,718 B2 | 10/2014 | Jung et al. | |
| 9,201,235 B2 | 12/2015 | Jung | |
| 2004/0211659 A1 | 10/2004 | Velev | |
| 2013/0101753 A1 | 4/2013 | Eral et al. | |
| 2017/0153517 A1* | 6/2017 | Shin .................. | G02F 1/134336 |
| 2018/0113297 A1 | 4/2018 | Desai et al. | |
| 2019/0235335 A1* | 8/2019 | Lee ....................... | G02F 1/1368 |
| 2020/0346620 A1 | 11/2020 | Chung | |

FOREIGN PATENT DOCUMENTS

| | | | |
|---|---|---|---|
| JP | 6802709 B2 | 12/2020 | |
| KR | 10-2010-0035691 A | 4/2010 | |
| KR | 10-2014-0028366 A | 3/2014 | |
| KR | 10-1805300 B1 | 11/2017 | |
| KR | 10-2018-0045079 A | 5/2018 | |
| KR | 10-2010634 B1 | 8/2019 | |

(Continued)

*Primary Examiner* — Mariam Qureshi
(74) *Attorney, Agent, or Firm* — MORGAN, LEWIS & BOCKIUS LLP

(57) ABSTRACT

A pattern electrode structure, which is stacked between a base material and a dielectric layer of an electro-wetting apparatus, includes a plurality of branch electrodes formed in a direction perpendicular to an arbitrary plane perpendicular to a plane formed by the pattern electrode structure to be spaced from each other at regular intervals, and a plurality of sub-branch electrodes formed to extend from the plurality of branch electrodes by as much as a predetermined length in an inclined direction, whereby, self-cleaning performance may be more efficiently exhibited even for small droplets.

9 Claims, 13 Drawing Sheets

(56)　　　　　　　References Cited

FOREIGN PATENT DOCUMENTS

| KR | 10-2019-0125247 | A  | 11/2019 |
| KR |      10-2102653 | B1 |  4/2020 |
| KR |      10-2152647 | B1 |  9/2020 |
| KR | 10-2021-0057899 | A  |  5/2021 |
| WO | WO 2015/164847  | A1 | 10/2015 |

* cited by examiner

E          D

[Turn on]

E                                                                          E

OVERLAP O          ELECTRODE WIDTH W          OVERLAP O

DISTANCE d                                    DISTANCE d

PATTERN ELECTRODE STRUCTURE FOR ELECTRO-WETTING APPARATUS

CROSS-REFERENCE(S) TO RELATED APPLICATIONS

The present application claims priority to Korean Patent Application No. 10-2021-0176416, filed on Dec. 10, 2021, the entire contents of which is incorporated herein for all purposes by this reference.

BACKGROUND OF PRESENT DISCLOSURE

Field of Present Disclosure

The present disclosure relates to an electrode structure to which a pattern structure using an electro-wetting technology phenomenon is applied.

DESCRIPTION OF RELATED ART

An electro-wetting phenomenon refers to a phenomenon of "change in contact angle between a solid and an electrolyte due to a difference in potential between the solid and the electrolyte."

When the phenomenon is used, since it is possible to control a surface tension of a droplet placed on an electrode coated with an insulator, deformation/movement of a microfluid of micro liters (μl) or less can be controlled.

Furthermore, because a separate external driving body is not required for driving, it is possible to reduce a weight of an applied product, a current flow is limited due to the insulator applied on the electrode, and thus power consumption is low and a response speed is fast, so that the electro-wetting phenomenon is getting great attention in various industries.

Examples of the use of electrowetting in various industries include a lab-on-a-chip, a fluid lens, and a display which are next-generation electronic devices different from the existing electronic devices.

Furthermore, because it is possible to move, deform, and remove droplets formed on a glass using an electro-wetting apparatus, the electro-wetting apparatus may be mounted on a windshield, a side mirror, and a camera of a vehicle to remove rainwater and dewdrops.

The present disclosure relates to a self-cleaning technology using an electro-wetting phenomenon.

The "electro-wetting self-cleaning apparatus" has a structure and a function which are capable of periodically and repeatedly applying a direct current (DC) or an alternating current (AC) to a surface of a substrate.

When a "fluid drop (sessile drop) with polarity" is placed on a surface of the "electro-wetting self-cleaning apparatus," the "fluid drop with polarity" may receive attraction and a repulsive force due to an electric field formed on the surface of the substrate.

Thus, when a voltage being applied is a DC voltage, the "fluid droplet with polarity" may be drawn in a direction of the electric field, and when the voltage being applied is an AC voltage, an oscillation may occur in the "'fluid droplet with polarity" due to a periodic variation of the electric field.

The present disclosure is a method of generating an oscillation of the "fluid droplets with polarity" using the AC voltage and is a technique for inducing a falling by reducing a fixing force of a fluid droplet placed on a surface of the device.

That is, a force relationship before a voltage is applied (the fluid droplet adheres to the surface) is gravity=fixing force (friction force+viscous force+reaction force due to a contact angle hysteresis (CAH)), and after the voltage is applied (the fluid droplet starts sliding), the force relationship becomes gravity>fixing force (friction force+viscous force+reaction force due to the CAH ↓) so that the fluid droplet falls.

Here, the CAH refers to a phenomenon in which a contact angle has a specific range due to a non-homogeneous surface of a solid or an external factor.

FIG. 1 illustrates a basic electro-wetting self-cleaning apparatus in which an electrode layer 10, a dielectric layer 30, and a water repellent layer 40 are stacked on the glass 20 which is a base material.

The base material 20 is not limited to types of materials, and a transparent glass may be used for mounting on a product which transmits visible light, such as a camera.

The electrode layer 10 should be located below the dielectric layer 30 as a transparent electrode pattern layer, and the higher the electrical conductivity, the better the performance.

The electrode layer 10 is not necessarily transparent, and to be mounted on a product which transmits visible light, a transparent electrode should be used. Representative materials include oxide-based indium tin oxide (ITO), polymer-based poly(3,4-ethylenedioxythiophene) polystyrene sulfonate (PEDOT:PSS), and oxide-polymer composite fluorine-doped tin oxide (FTO).

As the dielectric layer 30 has a high dielectric constant and a thin thickness, performance can be improved and a high dielectric breakdown strength is achieved, and as defects are decreased, durability and lifetime are improved. As the dielectric layer 30 becomes more uniform, more homogeneous, and more continuous, a deviation in performance and durability become low.

The dielectric layer 30 may be formed as a single layer or a multi-layer, and representative materials of the dielectric layer 30 include oxide/nitride-based materials such as $SiO_2$/$TiO_2$/$Al_2O_3$/$CeO_2$/$HfO_2$/$ZrO_2$/$ZnO$/$SiON$/$Si_3N_4$, and polymer-based materials such as Parylene-C, a cyclic olefin polymer (COP), and para-methoxy methamphetamine (PMMA). A deposition method includes a wet method (spray, spin-coating, and ink-jet) and a dry method (E-beam, sputtering, and chemical vapor deposition (CVD)).

The water repellent layer 40 is not an essential component and can be omitted when an outermost layer of the dielectric layer 30 has a sufficiently high contact angle.

A fluorine compound is used as a representative material of the water repellent layer 40 and coated using a method such as E-beam or spin coating.

When a size of a fluid droplet is smaller than or equal to a width of a currently positioned electrode, an electromagnetic force due to an adjacent electrode is weakened so that an oscillation may be weakened or absent.

Therefore, as in an example of FIG. 2, the electrode E should be designed to fit a target size of the fluid droplet, that is, the droplet D, to be removed, and the droplet D should have predetermined amounts of overlaps O extending to adjacent electrodes.

In the related art, there is a technique in which a pattern of an electrode is formed in parallel to a direction of gravity so that a droplet easily falls in a direction of the electrode.

However, because a droplet having a small gravity due to a small mass is difficult to fall, there is a limit of self-cleaning on a small droplet. To the present end, when a thickness of the electrode is increased, there is a limit in that efficiency is not good.

Computatively, it is difficult for the related art to induce a falling motion when a volume of a droplet ranges from 0.2 µl to 0.1 µl.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY OF PRESENT DISCLOSURE

Various aspects of the present disclosure are directed to providing a pattern electrode structure for an electro-wetting apparatus, which is configured for more efficiently exhibiting self-cleaning performance even on a small droplet.

Other objects and advantages of the present disclosure may be understood by the following description and become apparent with reference to the exemplary embodiments of the present disclosure. Also, it is obvious to those skilled in the art to which the present disclosure pertains that the objects and advantages of the present disclosure may be realized by the means as claimed and combinations thereof.

In accordance with an exemplary embodiment of the present disclosure, there is provided a pattern electrode structure for an electro-wetting apparatus, which is stacked between a base material and a dielectric layer of an electro-wetting apparatus and which includes a plurality of branch electrodes formed in a direction perpendicular to an arbitrary plane perpendicular to a plane formed by the pattern electrode structure to be spaced from each other at predetermined intervals, and a plurality of sub-branch electrodes formed to extend from the plurality of branch electrodes by a predetermined length in an inclined direction thereof.

Furthermore, the sub-branch electrode extending from one branch electrode among the plurality of branch electrodes may be formed to be spaced from a sub-branch electrode extending from an adjacent branch electrode by a predetermined distance.

Furthermore, the plurality of sub-branch electrodes may be formed to branch and extend from first and second sides of the branch electrodes.

Here, the plurality of sub-branch electrodes branching to both the sides of the branch electrodes may be formed to be inclined in the same direction of an upward direction and a downward direction thereof.

Furthermore, a height at which the plurality of sub-branch electrodes branching to one side of the branch electrodes may be different from a height at which the plurality of sub-branch electrodes branching to another side of the branch electrodes branch based on the branch electrodes.

Alternatively, the height at which the plurality of sub-branch electrodes branching to one side of the branch electrodes may be equal to the height at which the plurality of sub-branch electrodes branching to another side of the branch electrodes branch based on the branch electrodes.

Meanwhile, among the plurality of sub-branch electrodes branching to the first and second sides of the branch electrodes, an inclined direction of the plurality of sub-branch electrodes branching to one side and the plurality of sub-branch electrodes branching to another side may be different directions of an upward direction and a downward direction thereof.

Furthermore, a height at which the plurality of sub-branch electrodes branching to one side of the branch electrodes may be different from a height at which the plurality of sub-branch electrodes branching to another side of the branch electrodes branch based on the branch electrodes.

Alternatively, the height at which the plurality of sub-branch electrodes branching to one side of the branch electrodes may be equal to the height at which the plurality of sub-branch electrodes branching to another side of the branch electrodes branch based on the branch electrodes.

Furthermore, the plurality of sub-branch electrodes may be formed to branch and extend from only one side of the branch electrodes.

Next, in accordance with another exemplary embodiment of the present disclosure, there is provided a pattern electrode structure for an electro-wetting apparatus, which is stacked between a base material and a dielectric layer of the electro-wetting apparatus, includes a first electrode and a second electrode, wherein the first electrode is formed in a perpendicular direction with respect to an arbitrary plane perpendicular to a plane formed by the pattern electrode structure and includes a plurality of first branch electrodes formed in a direction perpendicular to an arbitrary plane perpendicular to a plane formed by the pattern electrode structure and spaced from each other by predetermined intervals, and a plurality of first sub-branch electrodes extending from the plurality of first branch electrodes by a predetermined length in an inclined direction, and the second electrode is formed in the perpendicular direction with respect to the arbitrary plane perpendicular to the plane formed by the pattern electrode structure and includes a plurality of second branch electrodes formed to be spaced from each other by predetermined intervals, and a plurality of second sub-branch electrodes extending from the plurality of second branch electrodes by a predetermined length in an inclined direction thereof.

Furthermore, the first branch electrode and the second branch electrode may be formed to be alternately provided in a horizontal direction, and inclination directions of the first sub-branch electrode and the second sub-branch electrode, which branch in opposite directions of adjacent first branch electrodes and a second branch electrode, may be different from each other of an upper direction and a lower direction thereof.

Furthermore, the plurality of first sub-branch electrodes and the plurality of second sub-branch electrodes may be formed so that the second sub-branch electrode is provided between the adjacent first sub-branch electrodes.

Furthermore, the plurality of first sub-branch electrodes may be formed to branch and extend from both sides of the first branch electrode, and the plurality of second sub-branch electrodes may be formed to branch and extend from first and second sides of the second branch electrodes.

Furthermore, the plurality of first sub-branch electrodes branching to both the sides of the first branch electrode may be formed to be inclined in the same direction of an upward direction and a downward direction, and the plurality of second sub-branch electrodes branching to the first and second sides of the second branch electrode may be formed to be inclined in the same direction of an upward direction and a downward direction thereof.

Furthermore, a height at which the plurality of first sub-branch electrodes branching to one side of the first branch electrode may be different from a height at which the plurality of first sub-branch electrodes branching to another side of the first branch electrodes branch based on the first branch electrodes, and a height at which the plurality of second sub-branch electrodes branching to one side of the second branch electrodes may be different from a height at which the plurality of second sub-branch electrodes branching to another side of the second branch electrodes branch based on the second branch electrodes.

Alternatively, among the plurality of first sub-branch electrodes branching to the first and second sides of the first branch electrodes, an inclined direction of the plurality of first sub-branch electrodes branching to one side and the plurality of first sub-branch electrodes branching to another side may be different directions of an upward direction and a downward direction, and among the plurality of second sub-branch electrodes branching to the first and second sides of the second branch electrodes, an inclined direction of the plurality of second sub-branch electrodes branching to one side and the plurality of second sub-branch electrodes branching to another side may be different directions of an upward direction and a downward direction thereof.

Alternatively, the height at which the plurality of first sub-branch electrodes branching to one side of the first branch electrode may be different from the height at which the plurality of first sub-branch electrodes branching to another side of the first branch electrodes branch based on the first branch electrodes, and the height at which the plurality of second sub-branch electrodes branching to one side of the second branch electrode may be different from the height at which the plurality of second sub-branch electrodes branching to another side of the second branch electrodes branch based on the second branch electrodes.

Meanwhile, the plurality of first sub-branch electrodes and the plurality of second sub-branch electrodes may be formed to branch and extended from only one sides of the first branch electrode and the second branch electrode.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a diagram illustrating a pattern electrode structure for an electro-wetting apparatus according to various exemplary embodiments of the present disclosure.

FIG. 6 is a diagram illustrating movement of a droplet in a structure of FIG. 5.

FIG. 8 and FIG. 9 are diagrams illustrating movement states of droplets in a pattern electrode structure for an electro-wetting apparatus according to various exemplary embodiments of the present disclosure.

FIG. 10 is a diagram illustrating a pattern electrode structure for an electro-wetting apparatus according to various exemplary embodiments of the present disclosure.

FIG. 11 is a diagram illustrating an application example of the pattern electrode structure for the electro-wetting apparatus according to various exemplary embodiments of the present disclosure.

FIG. 14 is a diagram illustrating a third application example of the pattern electrode structure for the electro-wetting apparatus according to various exemplary embodiments of the present disclosure.

Figure 1:
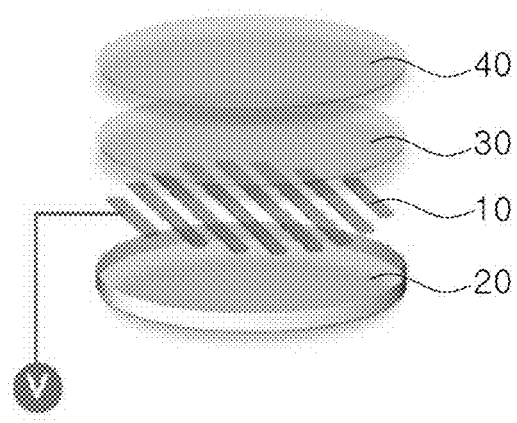
FIG. 1 is a schematic diagram illustrating a basic electro-wetting apparatus.
Figure 2:
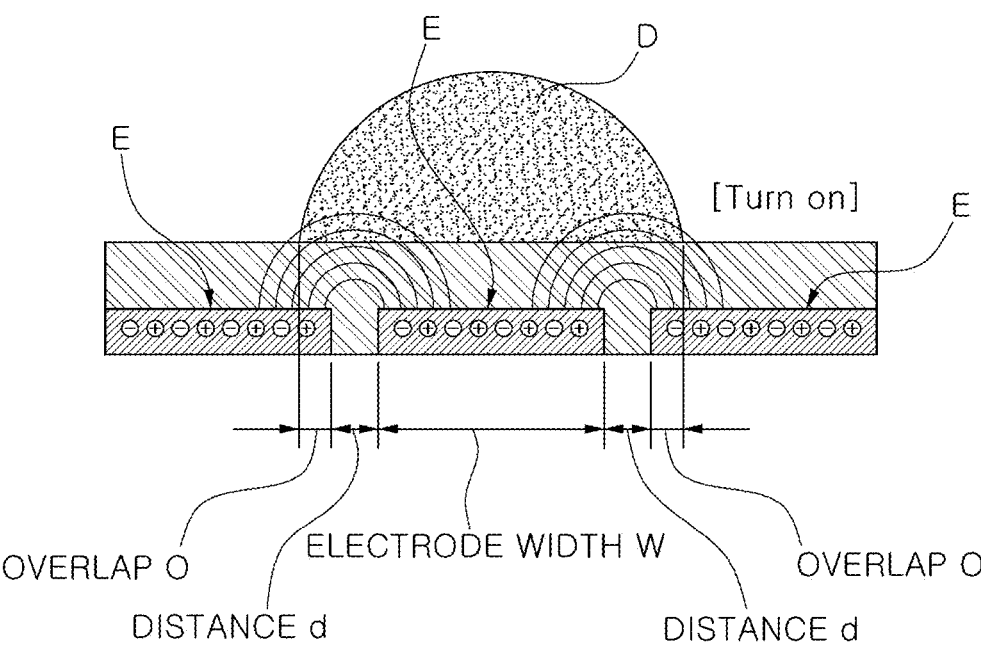
FIG. 2 is a diagram illustrating a comparison of sizes of s droplet and an electrode.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

To fully understand the present disclosure and operational advantages of the present disclosure and objects attained by practicing the present disclosure, reference should be made to the accompanying drawings that illustrate exemplary embodiments of the present disclosure and to the description in the accompanying drawings.

In describing exemplary embodiments of the present disclosure, known technologies or repeated descriptions may be reduced or omitted to avoid unnecessarily obscuring the gist of the present disclosure.

Figure 3:
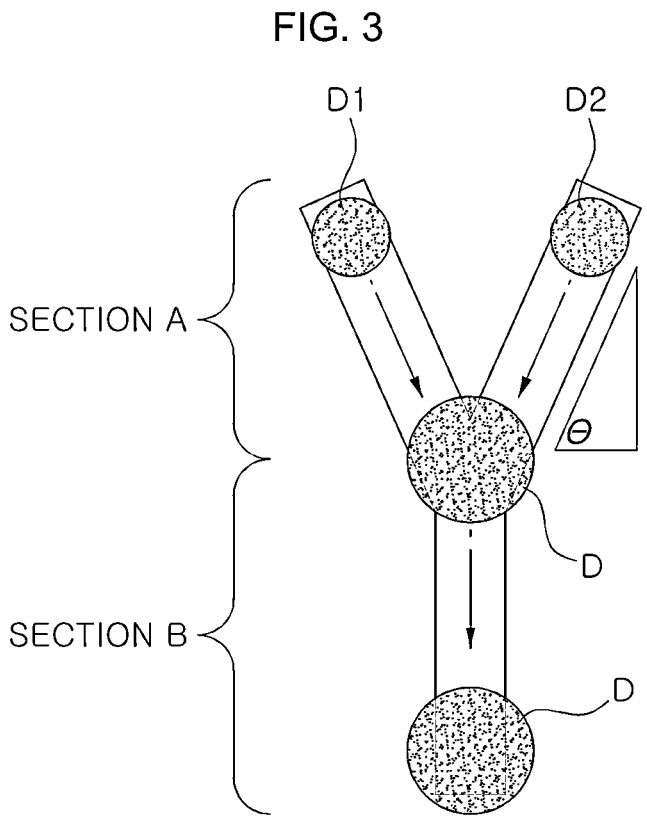
FIG. 3 is a diagram illustrating a concept of a pattern electrode structure of the present disclosure.
Figure 4:
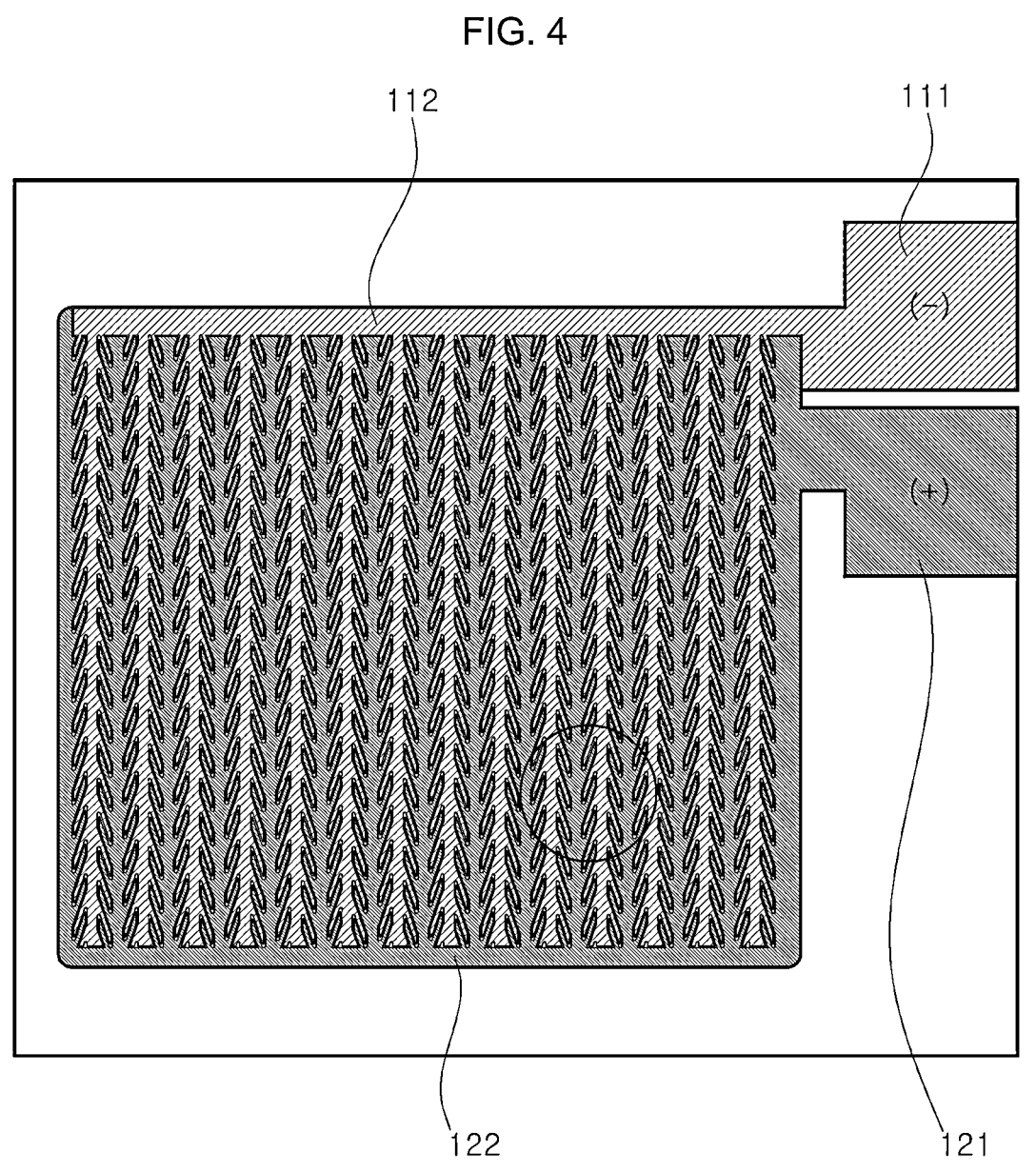

FIG. 3 is a diagram illustrating a concept of a pattern electrode structure of the present disclosure, and FIG. 4 is a diagram illustrating a pattern electrode structure for an electro-wetting apparatus according to a first exemplary embodiment of the present disclosure.

Figure 5:
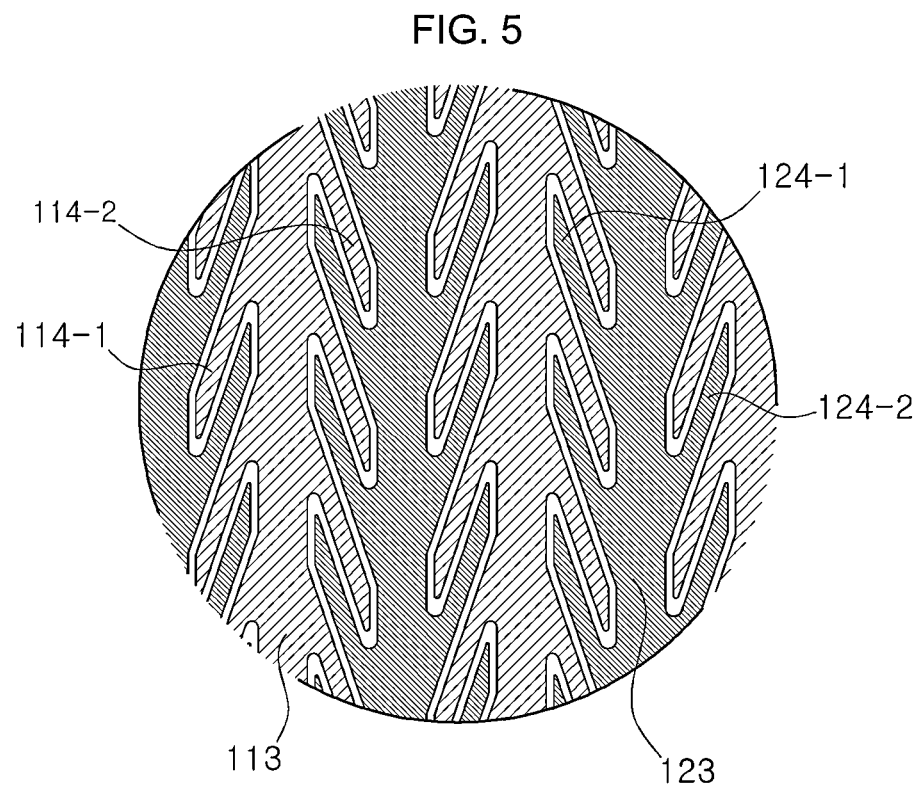
FIG. 5 is a diagram illustrating a portion marked with a scale of FIG. 4.
Figure 6:
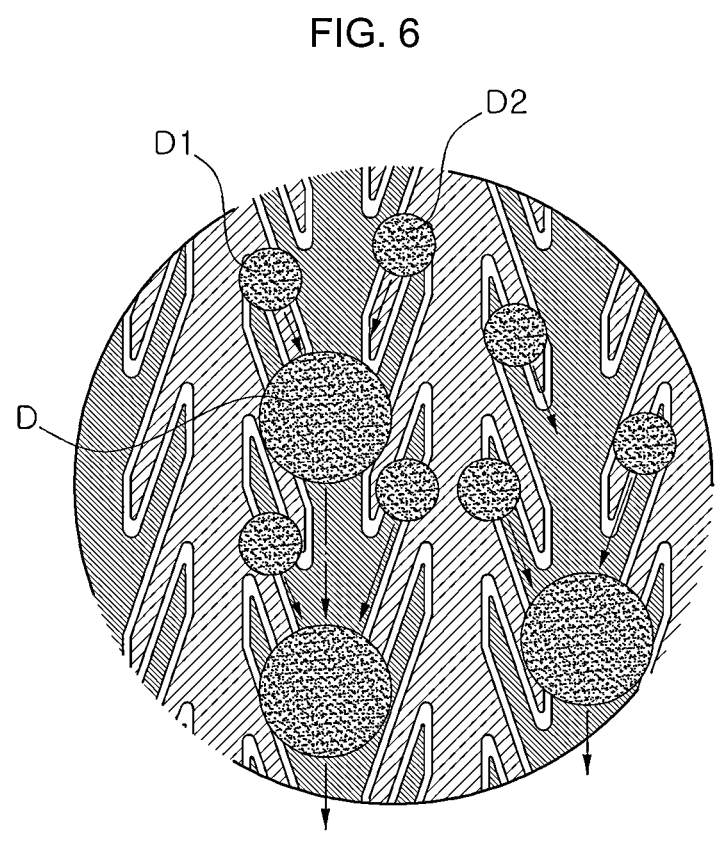

Furthermore, FIG. 5 is a diagram illustrating a portion marked with a scale of FIG. 4, and FIG. 6 is a diagram illustrating movement of a droplet in a structure of FIG. 5.

Hereinafter, a pattern electrode structure for an electro-wetting apparatus according to an exemplary embodiment of the present disclosure will be described with reference to FIG. 3, FIG. 4, FIG. 5 and FIG. 6.

The present disclosure relates to a pattern electrode structure for an electro-wetting apparatus, which increases a falling speed of a droplet having a small volume to improve cleaning efficiency and is a patterning technique for inducing a merging of droplets by controlling movement directions of relatively small droplets D1 and D2 as shown in FIG. 3.

Therefore, the merged droplet D has a mass and a volume which are greater than a mass and a volume of the existing droplet, and thus a falling motion may be more easily generated due to increased gravity.

As shown in the drawings, in the present disclosure, the electrode has a specific angle between zero degree and 90 degrees based on a horizontal line and has a structure in which a plurality of upper electrodes is gathered and integrated into one lower electrode.

The pattern includes an electrode for receiving an externally applied voltage, a base electrode for delivering a voltage applied from the electrode, and a branch electrode which branches off from the base electrode and in which patterns having different polarities intersect to form an electric field, and the pattern will be described in more detail below.

A droplet on a surface of an electrode pattern moves in a length direction of the electrode pattern. In section A, a downward driving force is $\cos(90-\theta)$ times less than a downward driving force of a vertical pattern, whereas when reaching section B, droplets are merged, a mass is increased, gravity is increased, and the downward driving force is improved.

That is, a falling speed in section A is lower than a falling speed in section B, and as a magnitude of $\theta$ is decreased, a force in a sliding direction is largely increased.

In section B, two droplets are merged, and thus gravity is increased in addition to an increase in mass. A radius of the droplet is also increased, and thus a fixing force due to a viscous force, a friction force, and a contact angle hysteresis (CAH) is also slightly increased. However, because a value is small with respect to the gravity increased due to the changed radius, the downward driving force is increased.

Referring to FIG. 4 and FIG. 5, the pattern electrode structure according to the first exemplary embodiment of the present disclosure has a basic structure of the Y-shaped pattern structure as shown in FIG. 3.

The pattern electrode structure has sub-branches of various angles in a range of greater than zero degree and less than 90 degrees in the two base patterns, as the droplet merges to a main branch, a mass of the droplet is increased, and gravity is increased due to the increased mass so that the droplet may be easily removed.

The pattern electrode structure includes a first electrode and a second electrode. The first electrode includes a first electrode connector 111, a first base pattern electrode 112, a first branch electrode 113, and a first sub-branch electrode 114, and the second electrode includes a second electrode connector 121, a second base pattern electrode 122, a second branch electrode 123, and a second sub-branch electrode 124.

As shown in the drawings, the pattern electrode structure including an entirely quadrangular flat surface has been exemplified, when viewed in a plan view, an external circumference shape may be applied as various shapes including a shape of a circle and the like as long as it may include a characteristic of the branch electrode of the present disclosure.

Furthermore, because the pattern electrode structure of the present disclosure is for receiving an alternating-current (AC) voltage, vibrating droplets on the electrode to fall, performing self-cleaning. A plane formed by an overall structure body of the pattern electrode structure should be a plane perpendicular to a horizontal plane or a plane which is inclined at a predetermined angle.

Therefore, as shown in the drawings, it is possible to form an inclination of 90 degrees or less from the top portion to the bottom portion.

The first electrode connector 111 and the second electrode connector 121 are components for being connected to a power source to receive a voltage, and the first base pattern electrode 112 and the second base pattern electrode 122 are connected to the first electrode connector 111 and the second electrode connector 121, respectively, to form an external circumference of an entirety of the pattern electrode structure. That is, the first electrode connector 111 forms a predetermined region of the external circumference, and the second electrode connector 121 forms the remaining region of the external circumference.

The first branch electrode 113 and the second branch electrode 123 are provided in one direction on the electrode structure, and the one direction is formed in a perpendicular direction with respect to an arbitrary plane perpendicular to the electrode structure, and the first branch electrode 113 and the second branch electrode 123 are each spaced apart at regular intervals to be formed as a plurality of first branch electrodes 113 and a plurality of second branch electrodes 123. As shown in the drawings, the first branch electrode 113 and the second branch electrode 123 are alternately provided in a horizontal direction thereof.

Furthermore, one end portions of the first branch electrode 113 and the second branch electrode 123 are connected to the first base pattern electrode 112 and the second base pattern electrode 122, respectively, and one end portions in opposite directions are connected to the base pattern electrode.

Next, the first sub-branch electrode 114 is formed to extend to be inclined downward toward both sides of the first branch electrode 113, and a plurality of first sub-branch electrodes 114 are formed to be spaced from each other. That is, the plurality of first sub-branch electrodes 114 are formed to extend in a lower right direction or a lower left direction thereof.

The first sub-branch electrode 114 is formed to extend by as much as a predetermined length and is formed to be spaced from a first sub-branch electrode 114 branching from an adjacent first branch electrode 113 by as much as a predetermined interval, and thus the second branch electrode 123 and the second sub-branch electrode 124 are provided between the first branch electrode 113 and the first sub-branch electrode 114.

Accordingly, the second sub-branch electrode 124 is formed to extend to be inclined upward toward both the sides of the second branch electrode 123, and the extension direction of the second sub-branch electrode 124 is, that is, an upper right direction or an upper left direction thereof.

The second sub-branch electrode 124 is formed to extend by as much as a predetermined length and is formed to be spaced from a second sub-branch electrode 124 branching from an adjacent second branch electrode 123 by as much as a predetermined interval, and thus the second sub-branch electrode 124 is in a form of being provided in a region between a pair of first branch electrodes 113.

As described above, the first sub-branch electrodes 114 in the lower right direction or the lower left direction may be formed opposite to the second sub-branch electrodes 124 in the upper right direction or the upper left direction thereof.

That is, the first sub-branch electrodes 114 may be formed in the upper right direction or the upper left direction, and the second sub-branch electrodes 124 may be formed in the lower right direction or the lower left direction thereof.

Furthermore, all the first sub-branch electrodes 114 may be symmetrically formed to be inclined downward, and all the second sub-branch electrodes 124 may be symmetrically formed to be inclined upwards. As shown in the drawings, each of the first sub-branch electrodes 114 and the second sub-branch electrodes 124 has a pattern structure, as being referred to as a shifted pattern structure, instead of a perfectly symmetric structure based on the sub-branch electrode.

That is, at the same height of the branch electrode, there is a difference in height between the sub-branch electrode branching in the left direction without branching to both the sides and the sub-branch electrode branching in the right direction without branching to both the sides.

Figure 12:
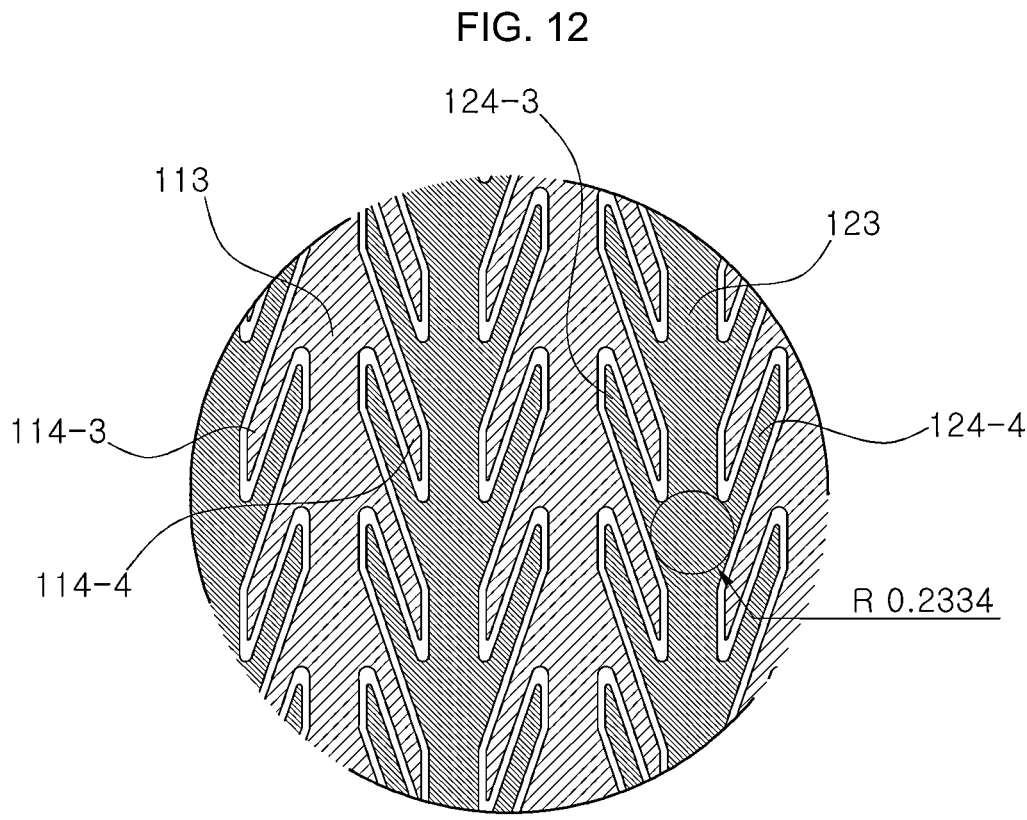
FIG. 12 is a diagram illustrating a first application example of the pattern electrode structure for the electro-wetting apparatus according to various exemplary embodiments of the present disclosure.

In contrast, as in the application example of FIG. 12, first sub-branch electrodes 114-3 and 114-4 may be formed to be completely symmetric based on the first branch electrode 113, and second sub-branch electrodes 124-3 and 124-4 may be formed to be completely symmetrical based on the second branch electrode 123.

Because a probability of adhering to a surface is high when a fluid droplet is less than or equal to a width of the electrode, symmetrical or asymmetrical structures may be selected for minimizing or intentionally increasing water droplet adhesion. Furthermore, for the same reason, a length, a width, and an end portion shape of the sub-branch pattern of the pattern may be variously changed.

According to the pattern electrode structure of the present disclosure, which is configured as described above, as shown in FIG. 6, droplets D1 and D2 falling in a downward direction inclined along the second sub-branch electrode are merged at the branch electrode and volumes thereof are increased, and thus the droplets D1 and D2 easily fall along the branch electrode.

Figure 7:
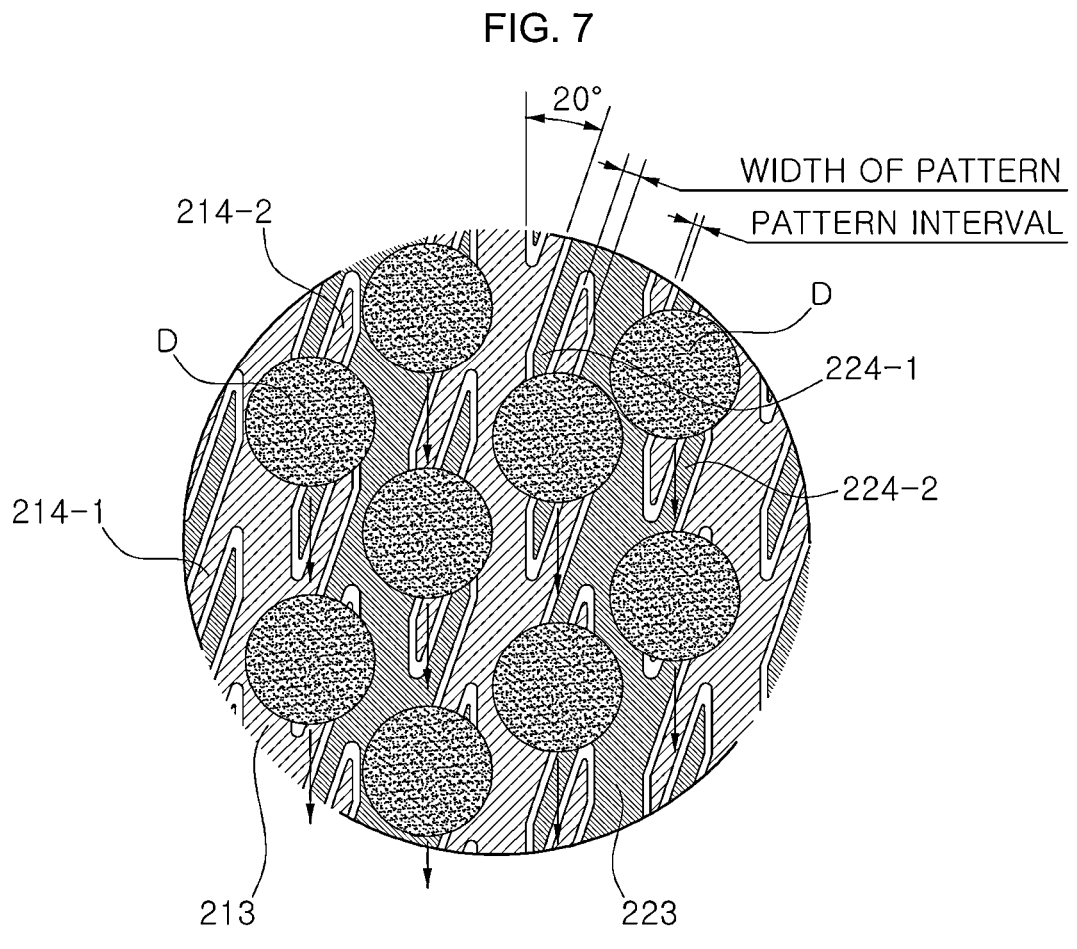
FIG. 7 is an enlarged diagram illustrating a portion of a pattern electrode structure for an electro-wetting apparatus according to various exemplary embodiments of the present disclosure.
Figure 8:
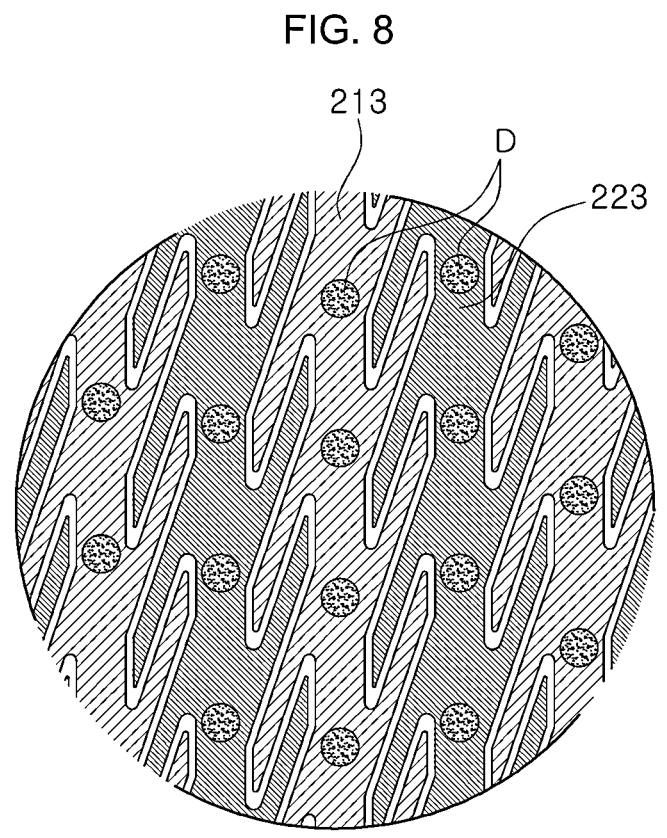
Figure 10:
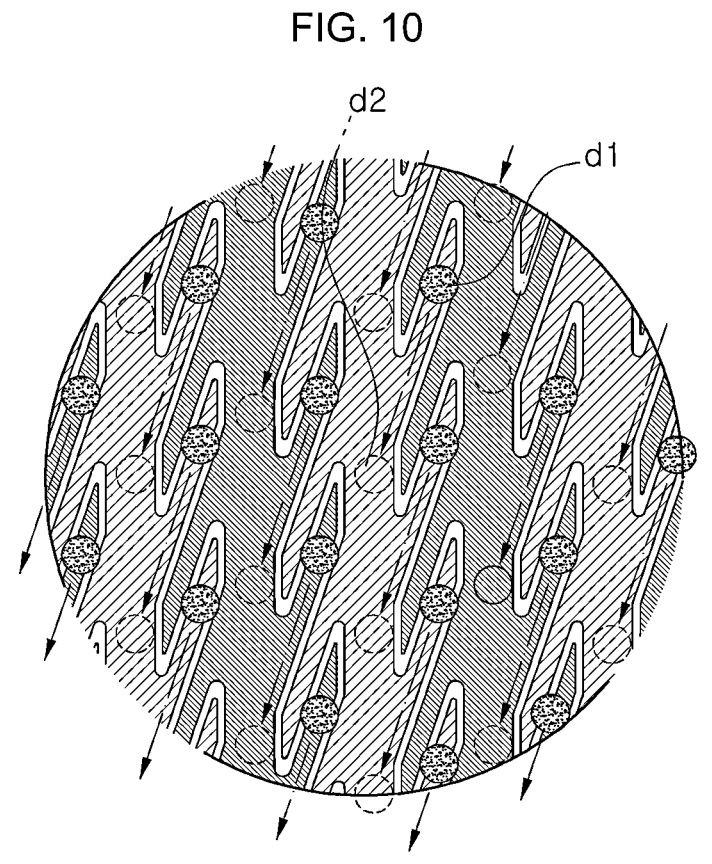

Next, FIG. 7 is an enlarged diagram illustrating a portion of a pattern electrode structure for an electro-wetting apparatus according to a second exemplary embodiment of the present disclosure, and FIG. 8 and FIG. 10 are diagrams illustrating movement states of droplets in a pattern electrode structure for an electro-wetting apparatus according to a second exemplary embodiment of the present disclosure.

A first electrode connector, a second electrode connector, a first base pattern electrode, and a second base pattern electrode are the same as the pattern electrode structure according to the first exemplary embodiment.

Furthermore, the first branch electrode 213 and the second branch electrode 223 are provided in one direction on the electrode structure, and the one direction is formed in a perpendicular direction with respect to an arbitrary plane perpendicular to the electrode structure, and the first branch electrode 213 and the second branch electrode 223 are each spaced apart at regular intervals to be formed as a plurality of first branch electrodes 213 and a plurality of second branch electrodes 223. As shown in the drawings, the first branch electrode 213 and the second branch electrode 223 are alternately provided in a horizontal direction thereof.

Next, the first sub-branch electrode is formed to extend from the first branch electrode 213 to be inclined toward both sides, and an inclined direction of a first sub-branch electrode 214-1 extending to one side of both the sides is different from an inclined direction of a first sub-branch electrode 214-2 extending to the other side thereof. That is, in the example, the first sub-branch electrode 214-1 extending in a left direction in the drawing of the first branch electrode 213 may be formed to be inclined downward (a lower left direction), the first sub-branch electrode 214-2 extending in a right direction in the drawing of the first branch electrode 213 may be formed to be inclined upward (an upward-right direction), and the inclined direction may be formed to be opposite to each other.

The first sub-branch electrodes 214-1 and 214-2 are formed to extend by as much as a predetermined length and are formed to be spaced from first sub-branch electrodes 214-1 and 214-2 branching from an adjacent first branch electrode 213 by as much as a predetermined interval, and thus the second branch electrode 223 and second sub-branch electrodes 224-1 and 224-2 are provided between the first branch electrode 213 and the first sub-branch electrodes 214-1 and 214-2.

Thus, the second sub-branch electrode is formed to extend from the second branch electrode 223 to be inclined toward both sides, and an inclined direction of the second sub-branch electrode 224-1 extending to one side of both the sides is different from an inclined direction of the second sub-branch electrode 224-2 extending to the other side thereof. That is, in the example, the second sub-branch electrode 224-1 extending in the left direction in the drawing of the second branch electrode 223 may be formed to be inclined downward (the lower left direction), the second sub-branch electrode 224-2 extending in the right direction in the drawing of the second branch electrode 223 may be formed to be inclined upward (the upward-right direction), and the inclined direction may be formed to be opposite to each other.

The second sub-branch electrode is formed to extend by as much as a predetermined length and is formed to be spaced from the second sub-branch electrode branching from an adjacent second branch electrode 223 by as much as a predetermined interval so that the second sub-branch electrodes 224-1 and 224-2 are arranged in an area between the pair of first sub-branch electrodes 213-1 and 213-2.

Figure 13:
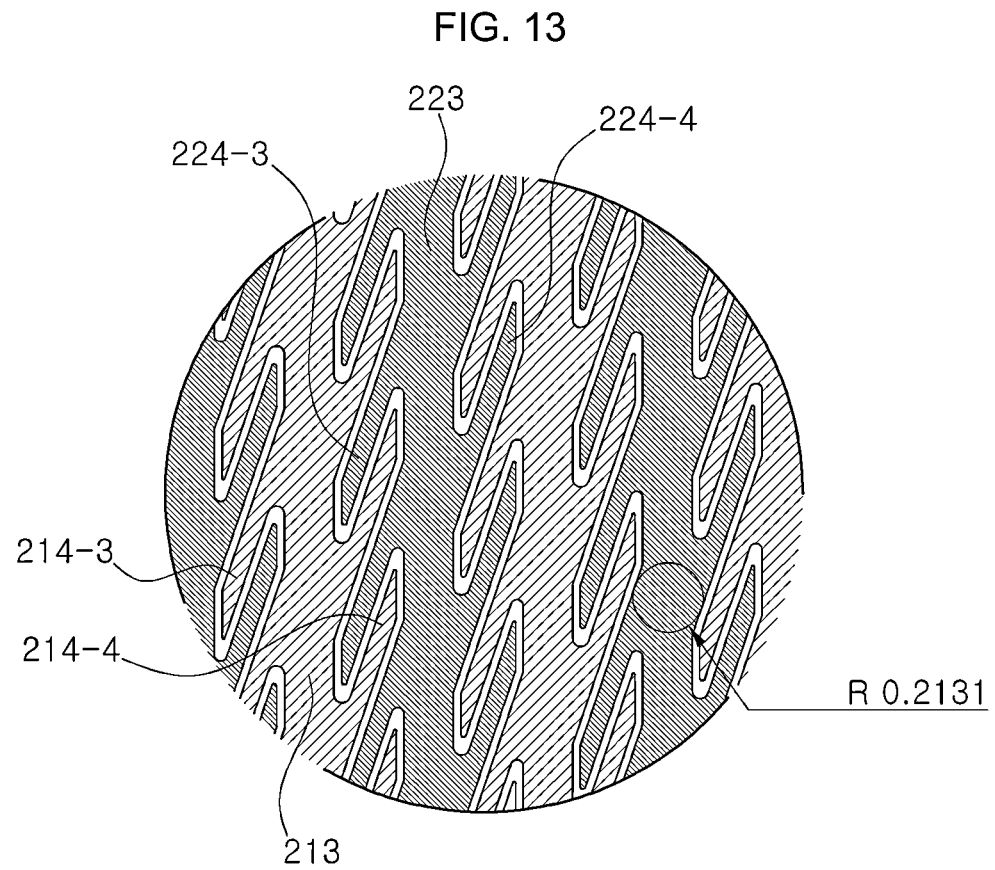
FIG. 13 is a diagram illustrating a second application example of the pattern electrode structure for the electro-wetting apparatus according to various exemplary embodiments of the present disclosure.

Meanwhile, as in the first application example of FIG. 13, the first sub-branch electrodes 214-3 and 214-4 having an origin symmetry relationship may be provided to branch at the same height as the first branch electrode 213, whereas, in the second exemplary embodiment of FIG. 7, the first sub-branch electrodes 214-3 and 214-4 may be provided to be shifted to branch at different heights.

Figure 14:
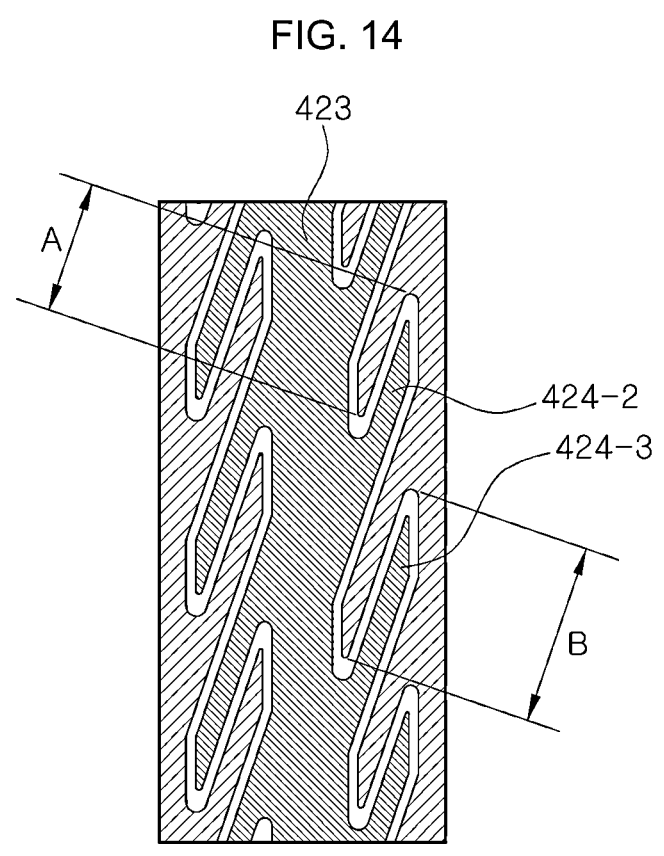

Furthermore, as in the second application example of FIG. 14, the length of the pattern may be varied according to a design intent and may be different according to a position.

That is, as in the example, second sub-branch electrodes 424-2 and 424-3 inclined upwards from a second branch electrode 423 in one direction may be formed to have different lengths (A<B).

Generally, a width of a sub-branch pattern is designed to be smaller than a width of a main branch pattern because the purpose of the sub-branch pattern often focuses on movement of small fluid droplets which are difficult to remove using the main branch pattern.

According to the pattern electrode structure of the present disclosure, which is configured as described above, as shown in FIG. 6, droplets D1 and D2 falling in a downward direction inclined along the second sub-branch electrode are merged at the branch electrode and volumes thereof are increased, and thus the droplets D1 and D2 easily fall along the branch electrode.

In the example, an angle formed between the branch electrode and the sub-branch electrode may be 20 degrees and may be formed in various ways, such as 10 degrees according to the purpose of use.

Furthermore, a width of the sub-branch electrode and an interval between the first sub-branch electrode 214-1 and the second sub-branch electrode 224-2 may have various design dimensions.

The thinner the width, the easier it is to remove small water droplets, but this may be disadvantageous to remove large water droplets.

As shown in FIG. 7, when the droplet D (a fluid droplet) is located in the first branch electrode or the second branch electrode and has a size to overlap adjacent electrodes, the fluid droplet has a sufficient oscillation and a sufficient downward driving force necessary for falling to vertically fall.

As shown in FIG. 8, when the fluid droplet D is located on the first branch pattern 213 or the second branch pattern 223 and has a small size, because the fluid droplet D does not have a sufficient size to overlap adjacent electrodes, the fluid droplet does not have oscillation and a downward driving force necessary for falling to be stuck on a surface.

Figure 9:
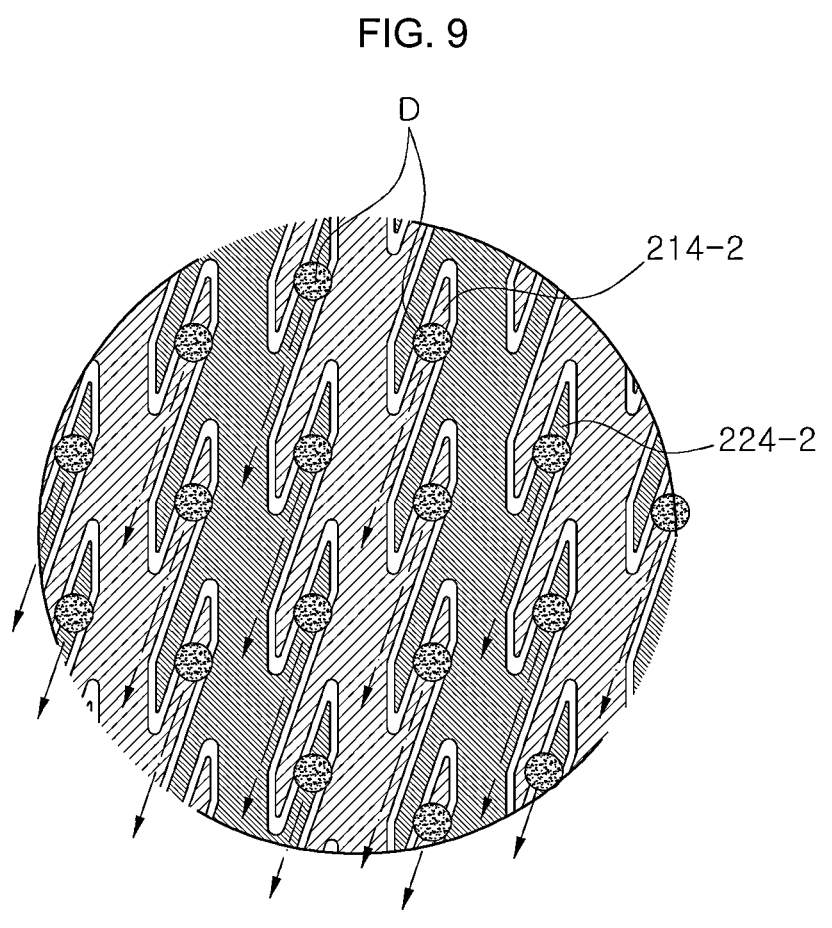

Furthermore, as shown in FIG. 9, when the fluid droplet D is located on the first sub-branch electrode 214-2 or the second sub-branch pattern 224-2, the fluid droplet D has oscillation and a downward driving force necessary for falling, falls along a pattern having an inclination angle, and moves to the first branch pattern or the second branch pattern.

Furthermore, as shown in FIG. 10, relatively small fluid droplets d1 and d2 falling from the first and second sub-branch patterns to the first and second branch patterns meet small fluid droplets stuck to the first and second branch patterns to form larger fluid droplets.

Therefore, by adjusting the electrode widths and intervals of the first sub-branch pattern and the second sub-branch pattern, it is possible to generate movement of fluid droplets having various sizes. (However, a difference in movement speed occurs according to the width and interval of the pattern and the size of the fluid droplet).

Figure 11:
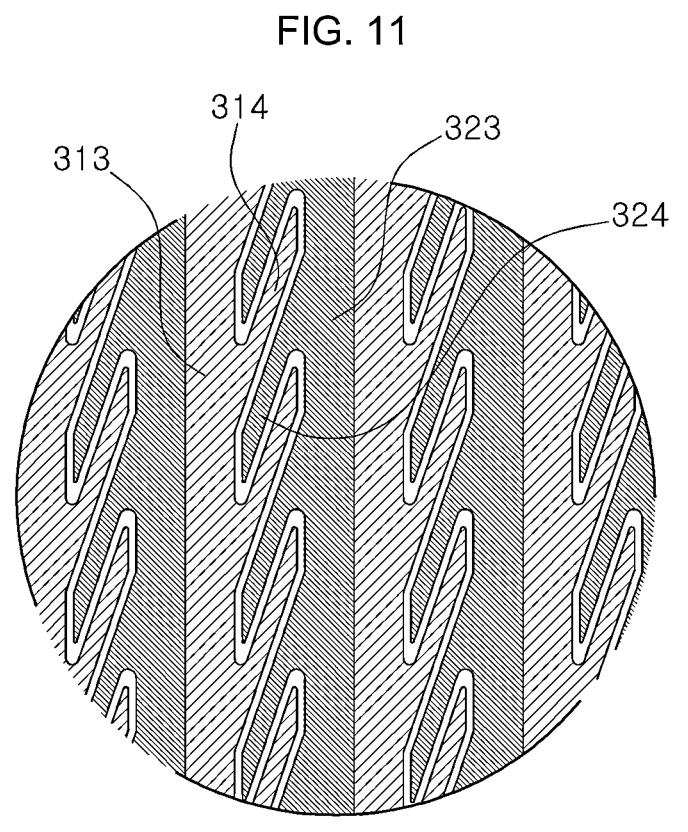

Next, FIG. 11 illustrates a pattern electrode structure for an electro-wetting apparatus according to a third exemplary embodiment of the present disclosure, and only a configuration different from the above embodiment will be described.

Unlike the above embodiment, in the pattern electrode structure according to the third exemplary embodiment, a first sub-branch electrode 314 and a second sub-branch electrode 324 have a one-sided structure extending from a first branch electrode 313 and a second branch electrode 323 to be inclined toward only one side thereof. In the example, the first sub-branch electrode 314 is formed to extend in an upper right direction from one side, and the second sub-branch electrode 324 is formed to extend in a left lower direction from one side thereof.

That is, the first sub-branch electrode 314 and the second sub-branch electrode 324 extend to be inclined in opposite directions to be provided at intervals therebetween.

When an electro-wetting apparatus of the present disclosure is driven, it is possible to improve a phenomenon in which fluid droplets, each having a specific size (or volume) or less, are not removed and attached on a surface.

Furthermore, an additional sub-branch pattern is added to the existing branch pattern so that a sliding direction of the fluid droplet may be induced, and the induced fluid droplets may be merged to form a fluid droplet having a large mass and a large volume.

Furthermore, the fluid droplets having the increased mass and the increased volume have stronger oscillation and downward driving forces by an electro-wetting self-cleaning device so that cleaning performance may be improved.

This technology is useful for applications in which small water droplets occupy a large area in an image of a rear view camera or a surround view monitoring (SVM) camera and is effective in solving an error of the recognition detector due to rainwater/contamination. (Recognition of pedestrians, signs, vehicles, and the like)

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A pattern electrode structure for an electro-wetting apparatus, which is stacked between a base material and a dielectric layer of the electro-wetting apparatus, the pattern electrode structure comprising:

a plurality of branch electrodes formed in a direction perpendicular to an arbitrary plane perpendicular to a plane formed by the pattern electrode structure to be spaced from each other at regular intervals; and a plurality of sub-branch electrodes formed to extend from the plurality of branch electrodes by a predetermined length in an inclined direction, wherein, among the plurality of sub-branch electrodes, a sub-branch electrode extending from one branch electrode among the plurality of branch electrodes is formed to be spaced from a sub-branch electrode extending from an adjacent branch electrode by a predetermined distance, wherein the sub-branch electrode extending from the one branch electrode among the plurality of branch electrodes is placed between sub-branch electrodes extending from the adjacent branch electrode, wherein the inclined direction of the plurality of sub-branch electrodes extended from same side of the plurality of branch electrodes is same, and wherein the sub-branch electrode extending from the adjacent branch electrode is arranged between two sub-branch electrodes extending from one branch electrode among the plurality of branch electrodes and arranged vertically adjacent to each other.

2. The pattern electrode structure of claim 1, wherein the plurality of sub-branch electrodes is formed to branch and extend from first and second sides of the branch electrodes.

3. The pattern electrode structure of claim 2, wherein the plurality of sub-branch electrodes branching to the first and second sides of the branch electrodes is formed to be inclined in a same direction of an upward direction and a downward direction.

4. The pattern electrode structure of claim 2, wherein a height at which the plurality of sub-branch electrodes branching to one side of the branch electrodes branch is different from a height at which the plurality of sub-branch electrodes branching to another side of the branch electrodes branch based on the branch electrodes.

5. The pattern electrode structure of claim 2, wherein a height at which the plurality of sub-branch electrodes branching to one side of the branch electrodes is equal to a height at which the plurality of sub-branch electrodes branching to another side of the branch electrodes branch based on the branch electrodes.

6. The pattern electrode structure of claim 2, wherein, among the plurality of sub-branch electrodes branching to the first and second sides of the branch electrodes, an inclined direction of the plurality of sub-branch electrodes branching to one side and the plurality of sub-branch electrodes branching to another side are different directions of an upward direction and a downward direction.

7. The pattern electrode structure of claim 6, wherein a height at which the plurality of sub-branch electrodes branching to one side of the branch electrodes is different from a height at which the plurality of sub-branch electrodes branching to another side of the branch electrodes branch based on the branch electrodes.

8. The pattern electrode structure of claim 6, wherein a height at which the plurality of sub-branch electrodes branch off to one side of the branch electrodes is equal to a height at which the plurality of sub-branch electrodes branch off to another side of the branch electrodes branch based on the branch electrodes.

9. The pattern electrode structure of claim 1, wherein the plurality of sub-branch electrodes is formed to branch and extend from only one side of the branch electrodes.

\* \* \* \* \*